(12) United States Patent
Lyman

(10) Patent No.: US 10,152,737 B2
(45) Date of Patent: Dec. 11, 2018

(54) AUTOMATED WASTE MANAGEMENT

(71) Applicant: Vivint, Inc., Provo, UT (US)

(72) Inventor: Jefferson Lyman, Alpine, UT (US)

(73) Assignee: Vivint, Inc., Provo, UT (US)

( * ) Notice: Subject to any disclaimer, the term of this patent is extended or adjusted under 35 U.S.C. 154(b) by 990 days.

(21) Appl. No.: 14/262,558

(22) Filed: Apr. 25, 2014

(65) Prior Publication Data

US 2015/0307273 A1 Oct. 29, 2015

(51) Int. Cl.
*G06Q 30/06* (2012.01)
*G01G 19/08* (2006.01)
*G01G 19/38* (2006.01)
*G06Q 10/10* (2012.01)
*B65F 1/16* (2006.01)

(52) U.S. Cl.
CPC ....... *G06Q 30/0623* (2013.01); *B65F 1/1615* (2013.01); *G01G 19/08* (2013.01); *G01G 19/38* (2013.01); *G06Q 10/109* (2013.01); *B65F 2210/108* (2013.01); *B65F 2210/128* (2013.01); *B65F 2210/168* (2013.01); *B65F 2210/182* (2013.01); *B65F 2210/184* (2013.01)

(58) Field of Classification Search
CPC ............................ B29B 17/00; G06Q 30/0623
See application file for complete search history.

(56) References Cited

U.S. PATENT DOCUMENTS

2006/0173576 A1* 8/2006 Goerg ................ A47K 10/3845
700/236
2007/0278140 A1* 12/2007 Mallett ................... B07C 7/005
705/308
2008/0190953 A1* 8/2008 Mallett ................... A61L 11/00
221/13
2013/0278067 A1 10/2013 Poss et al.
2015/0294431 A1* 10/2015 Fiorucci ................ G06Q 50/26
705/13

(Continued)

FOREIGN PATENT DOCUMENTS

CN 201313715 9/2009
CN 203020857 U 6/2013

(Continued)

OTHER PUBLICATIONS

Maurizio Faccio et al, Waste collection multi objective model with real time traceability data, Aug. 6, 2011, Waste Management 31 (2011) 2391-2405.*

(Continued)

*Primary Examiner* — Andre D Boyce
(74) *Attorney, Agent, or Firm* — Holland & Hart, LLP

(57) ABSTRACT

A method for enabling automated waste management is described. In one embodiment, data related to an event detected via a sensor coupled to a trash receptacle is received. A waste collection vehicle is configured to collect trash directly from the trash receptacle. The data related to the detected event is processed. A notification is generated based on the processing of the data. In some cases, a notification based on a determination of a volume of trash within the trash receptacle is generated, where the volume is determined via a ranging sensor. A notification is generated based on a determination of a weight of the trash within the trash receptacle, where the weight is determined via a load sensor.

20 Claims, 7 Drawing Sheets

(56) References Cited

U.S. PATENT DOCUMENTS

2016/0300297 A1* 10/2016 Kekalainen ............ G06Q 10/08

FOREIGN PATENT DOCUMENTS

CN 103274143 A 9/2013
CN 203246756 U 10/2013

OTHER PUBLICATIONS

E.C. Rada et al, Web-GIS oriented systems viability for municipal solid waste selective collection optimization in developed and transient economies, Feb. 8, 2013, Waste Management 33 (2013) 785-792.*
English Abstract and English Machine Translation of CN103274143A. Sep. 4, 2013.
English Abstract and English Machine Translation of CN201313715. Sep. 23, 2009.
English Abstract and English Machine Translation of CN203020857 U. Jun. 26, 2013.
English Abstract and English Machine Translation of CN203246756 U. Oct. 23, 2013.

* cited by examiner

AUTOMATED WASTE MANAGEMENT

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of automation and security products. Advancements in automation and security devices enable increased control of homes and businesses. Automation of waste management systems, however, has lagged behind automation in other areas. As a result, benefits may be realized by providing systems and methods for automating waste management in relation to automation and security systems.

SUMMARY

According to at least one embodiment, a method for automated waste management is described. In one embodiment, data related to an event detected via a sensor coupled to a trash receptacle may be received. A waste collection vehicle may be configured to collect trash directly from the trash receptacle. The data related to the detected event may be processed. A notification may be generated based on the processing of the data.

In some cases, a notification based on a determination of a volume of trash within the trash receptacle may be generated, where the volume is determined via a ranging sensor. A notification may be generated based on a determination of a weight of the trash within the trash receptacle, where the weight is determined via a load sensor. A density of the trash within the trash receptacle may be determined as a result of determining the volume and load of trash within the trash receptacle. The density may be determined by computing a ratio of the volume of the trash to the weight of the trash in the trash receptacle.

In one embodiment, a notification may be generated upon detecting an opening of a lid of the trash receptacle, the opening of the lid being detected via an accelerometer. A notification may be generated upon detecting the trash receptacle being picked up and emptied by the waste collection vehicle, the emptying of the trash receptacle being detected via the accelerometer. A notification may be generated upon determining trash in the trash receptacle is within a predetermined range of a maximum capacity of the trash receptacle. In some configurations, a pickup for the trash receptacle may be automatically scheduled upon determining that trash in the trash receptacle is within a predetermined range of a maximum capacity of the trash receptacle.

In one embodiment, a location of the trash receptacle may be determined and a notification may be generated indicating the scheduled pickup and the detected location of the trash receptacle. In some cases, a query may be received regarding whether there is capacity in the trash receptacle available for purchase. An access code associated with the trash receptacle may be generated and sent to the querying user. The querying party may use the access code to access the trash receptacle. Upon verifying the access code, a lid of the trash receptacle may be unlocked via a remote-actuated locking mechanism. Upon detecting the lid of the trash receptacle in a closed position, the lid may be automatically locked via the remote-actuated locking mechanism. Likewise, in some cases, it may be determined whether a neighboring trash receptacle has capacity available for purchase. An access code associated with the trash receptacle may be received. The access code may be used to access the neighboring trash receptacle. Upon verifying the provided access code, a lid of the neighboring trash receptacle may be unlocked via a remote-actuated locking mechanism. Upon detecting the lid of the neighboring trash receptacle in a closed position, the lid may be automatically locked via the remote-actuated locking mechanism.

A computing device configured for automated waste management is also described. The device may include a processor and memory in electronic communication with the processor. The memory may store instructions that may be executable by the processor to receive data related to an event detected via a sensor coupled to a trash receptacle, where a waste collection vehicle being configured to collect trash directly from the trash receptacle. The memory may store instructions that may be executable by the processor to process the data related to the detected event and generate a notification based on the processing of the data.

A computer-program product for automated waste management is also described. The computer-program product may include a non-transitory computer-readable medium that stores instructions. The instructions may be executable by the processor to receive data related to an event detected via a sensor coupled to a trash receptacle, where a waste collection vehicle being configured to collect trash directly from the trash receptacle. The memory may store instructions that may be executable by the processor to process the data related to the detected event and generate a notification based on the processing of the data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
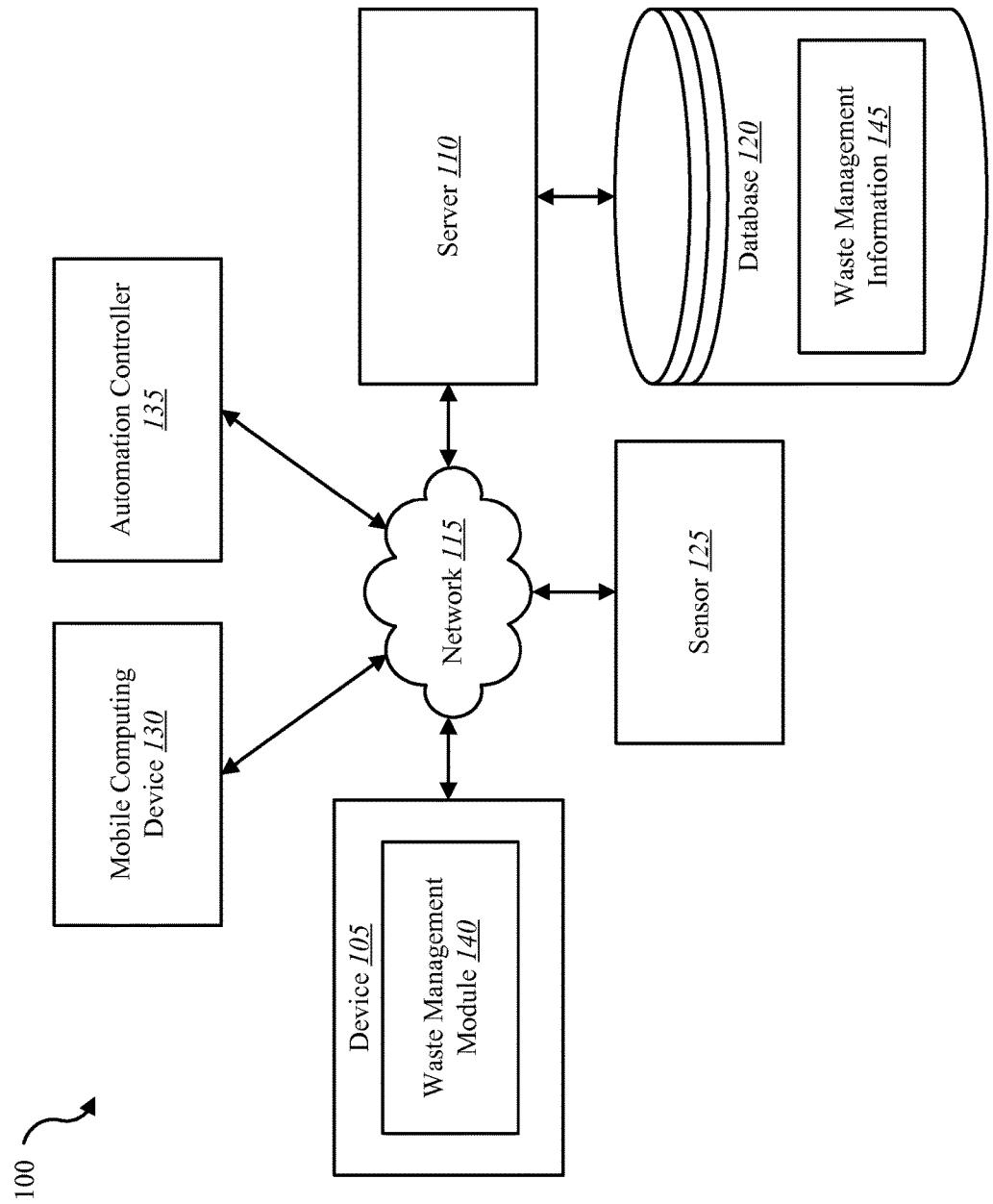
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to premises automation. More specifically, the systems and methods described herein relate to automated waste management in relation to a premises. There are number of challenges facing waste management. These challenges include generating varying amounts of trash from week to week. Conventional trash removal schedules typically include removing trash on a weekly basis. The amount of trash generated by a typical dwelling, however, may vary from week to week. To account for the varying amounts, a home owner may purchase one or more additional trash receptacles. Purchasing additional trash receptacles can cause excessive expenses. Not only does the home owner face the sizeable upfront cost of additional trash receptacles, but the home owner must also pay an increased monthly fee for each additional trash receptacle whether or not the additional trash receptacles are used on a particular week of trash removal. Another challenge facing waste management involves the pilfering of unused trash receptacle volume. Businesses, schools, restaurants, etc., often have trash dumpsters to collect their trash in a central location for efficient trash removal. Likewise, construction sites and demolition sites may rent large roll-off dumpsters to collect waste and debris from construction and demolition, where the waste removal is paid for by volume and/or weighing the amount of trash removed. Often, however, it is the case that people not authorized to use these trash dumpsters will illegally dump their trash in these trash dumpsters. In some cases, significant amounts of trash may be dumped, creating unwarranted costs to those who rightfully utilize such trash dumpsters. As a result, benefits may be realized by implementing systems and methods to mitigate the abovementioned challenges to waste management.

One aspect of the systems, methods and related devices described herein relates to determining how full a trash receptacle is and/or to determine when a trash receptacle is being opened, being closed, or being dumped. Presently, trash receptacles are "dumb" in that the receptacles do not include any sort of logic. One or more sensors may be added to trash receptacles to detect certain conditions and/or events. In some cases, information about a detected event may be used to determine patterns relative to the operation of the trash receptacle (e.g., certain times of the year produce more trash than other periods, trash is typically placed within the receptacle during certain times of the day, etc.), as well as predict activities associated with the trash receptacle that may occur in the future. The sensors may include one or more sensors integrated into one or more parts of a new trash receptacle and/or one or more sensors added to an existing trash receptacle. For example, a ranging sensor may be used to sense expended capacity and/or remaining capacity within a trash receptacle. The ranging sensors may include, for example, an acoustic ranging sensor (e.g., SONAR), an optical ranging sensor (e.g., LASER, LED, etc.), etc.

In another example, the one or more sensors may include a load sensor (e.g., pressure sensor, etc.) that determines the weight of collected trash. In some cases, a load sensor may gauge the fullness of the trash receptacle. In some cases, the density of collected trash may be determined relative to the volume expended by the collected trash and the detected weight of the collected trash. Thus, an owner of the trash receptacle may be notified of conditions where the expended volume of trash is high, whereas the load of the trash is low, indicating that the trash may be further compacted to make room for additional trash. A further example includes at least one accelerometer that may be used to detect movement relative to the trash receptacle. In some cases, an accelerometer may be located on a lid of a trash receptacle. Accordingly, the accelerometer may detect an opening of the lid, a closing of the lid, a dumping of the trash receptacle, and/or a tipping over of the trash receptacle. In some cases, the accelerometer may trigger activation of a camera relative to the trash receptacle, the camera being configured to capture one or more images (e.g., photos, video, etc.). In one example, the one or more sensors may include a motion sensor and/or a proximity sensor to detect an approach of a person towards the trash receptacle. Upon detecting the person approaching the trash receptacle, the camera may be activated and capture one or more images.

In another example, the trash receptacle may include one or more communication devices. The one or more communication devices may be used to communicate data to and/or from the trash receptacle. For example, the trash receptacle may include a wireless communication device (e.g., Z-Wave, Zigbee, BLUETOOTH® low energy, near-field communication (NFC), universal serial bus (USB) wireless, 345 MHz wireless, an IEEE 802 wireless standard, etc.) to send and/or receive data communications. Examples of data communications may include the communication device sending a message related to the opening, closing, and/or dumping of the trash receptacle. Additionally, or alternatively, the data communications may include the communication device sending a message related to a detected capacity or fullness of the trash receptacle, and/or a detected change relative to the capacity or fullness of the trash receptacle. In some cases, events and conditions sensed relative to the trash receptacle may be communicated to an automation/security system, where the automation/security system processes the communicated data and may send notifications based on the results of the processed data. For example, the automation and security system may send a notification to a control panel mounted on the wall of a home or business and/or may send a notification to a user device (e.g., desktop computer, laptop, tablet computing device, smart phone, television, etc.). In some cases, the communication device on the trash receptacle may send a notification directly to a user device. As an example, when the accelerometer detects the trash receptacle being tipped over, a notification may be generated indicating the trash receptacle is tipped over. Additionally, the notification may also indicate how much trash was in the trash receptacle at the moment when it was tipped over.

In some examples, a trash receptacle may include a locking mechanism. In some cases, the locking mechanism may keep the trash receptacle locked at all times. Function of the locking mechanism may be associated with a particular person. For example, a person may carry a device that communicates the person's identity. The identification device carried by the person may associate the operation of the locking mechanism with that person. The identification device may include a cell phone, a key fob, or any other device that may be programmable with user identification information. Accordingly, when a person carrying the identification device approaches the trash receptacle, the identification device may communicate a code to the locking mechanism causing the locking mechanism to unlock the lid of the trash receptacle. In some cases, after detecting a lid opening, one or more sensors may be configured to detect a period of inactivity. For example, a motion detector may detect no motion for a predetermined period of time since the lid was opened. An accelerometer may detect no movement for a predetermined period of time since the lid was opened. A sensor may determine no trash has been placed within the trash receptacle for a predetermined period of time since the lid was opened. Upon detecting a period of inactivity, a notification may be sent to a user device indicating that the lid of the trash receptacle is presently unsecured. In some cases, the locking mechanism may be configured to unlock when the accelerometer detects the trash receptacle being dumped into a waste collection vehicle. In some cases, the waste collection vehicle may include a device to unlock the locking mechanism. In some cases, a temporary access code may be sent to a neighbor allowing a neighbor to gain access to the unexpended volume of the trash receptacle within a predetermined time period. As described above, the neighbor may use a device to communicate the temporary access code in order to gain access to the trash receptacle.

Benefits may be realized by the abovementioned systems and methods. These benefits include enabling waste management companies to schedule waste collection based on detected capacity and/or fullness of one or more trash receptacles. For example, instead of collecting the waste on a weekly basis from residential trash receptacles and/or the dumpsters of businesses, restaurants, and schools, regardless of whether or not the trash receptacles and/or dumpsters are filled to capacity, a waste management company may schedule pickups based on the monitored capacity and/or fullness of each trash receptacle and/or dumpster. Accordingly, waste collection routes may be optimized to realize savings in man-hours, fuel costs, and machine-operation costs. Benefits may also include the ability to purchase, sell, and/or grant access to unused volume within a trash receptacle and/or dumpster. For example, upon detecting that a trash receptacle is full, the system may send a user a notification that a neighbor's trash receptacle has available capacity for a predetermined cost. In some cases, the neighbor may grant to the user temporary access to the neighbor's trash receptacle. The neighbor's trash receptacle may identify the user, grant access to the trash receptacle, and determine the amount and/or weight of trash disposed of by the user into the neighbor's trash receptacle. The user may then be charged according to the determined amount and/or weight of trash disposed into the neighbor's trash receptacle. Although this example involves a residential trash receptacle of a neighbor, the example equally applies to the available capacity in dumpsters associated with businesses, schools, restaurants, etc.

FIG. 1 is a block diagram illustrating one embodiment of an environment 100 in which the present systems and methods may be implemented. In some embodiments, the systems and methods described herein may be performed on a device (e.g., device 105). The environment 100 may include a device 105, a server 110, a sensor 125, a mobile computing device 130, an automation controller 135, and a network 115 that allows the device 105, the server 110, the mobile computing device 130, automation controller 135, and sensor 125 to communicate with one another.

Examples of the device 105 may include a sensor, a programmable logic device, an automation controller, a security controller, a mobile computing device, a smart phone, a personal computing device, a computer, a server, etc. In some cases, device 105 may include a trash receptacle such as a wheeled road-side residential trash receptacle, a dumpster, a roll-off dumpster, etc.

Examples of the server 110 may include a cloud server, a server administered by a premises automation and/or security company, and the like. Examples of the automation controller 135 may include a dedicated premises automation computing device (e.g., wall-mounted controller), a personal computing device (e.g., laptop, desktop, etc.), a mobile computing device (e.g., tablet computing device, smart phone, etc.), a server (e.g., a cloud server), and the like.

Examples of sensor 125 include a ranging sensor, load sensor, accelerometer, access-code reader (e.g., NFC, RFID, BT low power, etc.), motion sensor, proximity sensor, an image sensor (e.g., photo and/or video image sensor), audio sensor, forced entry sensor, shock sensor, proximity sensor, boundary sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, temperature sensor, heartbeat sensor, breathing sensor, oxygen sensor, carbon dioxide sensor, brain wave sensor, movement sensor, voice sensor, and the like. Sensor 125 may represent one or more separate sensors or a combination of two or more sensors in a single device. For example, sensor 125 may represent one or more camera sensors and one or more motion sensors connected to environment 100. Additionally, or alternatively, sensor 125 may represent a combination sensor such as both a camera sensor and a motion sensor integrated in the same device. Sensor 125 may be integrated with a facial recognition system. Although sensor 125 is depicted as connecting to device 105 over network 115, in some embodiments, sensor 125 may connect directly to device 105.

Additionally, or alternatively, sensor 125 may be integrated with a home appliance or fixture such as a light bulb fixture. Sensor 125 may include an accelerometer to enable sensor 125 to detect a movement. For example, sensor 125 may be attached to a lid of a trash receptacle enabling the sensor 125 to detect an opening of the lid, a trash receptacle being tipped over, a pickup of the trash receptacle by a waste collection vehicle, and the like. Sensor 125 may include a wireless communication device enabling sensor 125 to send and receive data and/or information to and from one or more devices in environment 100. Additionally, or alternatively, sensor 125 may include a GPS sensor to enable sensor 125 to track a location of sensor 125 attached to the trash receptacle. Sensor 125 may include a proximity sensor to enable sensor to detect a proximity of a person relative to a trash receptacle.

In some configurations, the device 105 may include a waste management module 140. Although certain elements are depicted as being external to device 105 (e.g., sensor 125), and certain elements are depicted as being internal to the device 105 (e.g., waste management module 140), it is understood that one or more of the depicted elements may be internal and/or external to the device 105 and connect to device 105 through wired and/or wireless connections. In some embodiments, an application may be installed on mobile computing device 130, the application enabling a user to interface with a function of device 105, waste management module 140, automation controller 135, and/or server 110.

In some embodiments, device 105 may communicate with server 110 via network 115. Example of networks 115 include cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. In some cases, the network 115 may include a wireless node fitted to a trash receptacle of the premises and one or more wireless nodes located in the premises (e.g., 802.11 WiFi router, WiFi bridge, etc.). At least one of the wireless nodes of network 115 may be based on short-range wireless technology such as a 345 MHz receiver, transmitter, and/or transceiver, near-field communication (NFC), radio-frequency identification (RFID), BLUETOOTH® low power, and the like. In some cases, a wireless node of the premises communicates over a cloud network to access application programing interfaces, by which one or more of the functions described herein may operate.

Device 105 may include logic and/or executable instructions that enables device 105 to interface with automation controller 135, mobile computing device 130, and/or server 110. In some embodiments, device 105, mobile computing device 130, automation controller 135, and server 110 may include a waste management module 140 where at least a portion of the functions of waste management module 140 are performed separately and/or concurrently on device 105, mobile computing device 130, automation controller 135, and/or server 110. Likewise, in some embodiments, a user may access the functions of device 105 and/or automation controller 135 from mobile computing device 130. For example, interfacing with one or more functions of device 105, automation controller 135, waste management module 140, and/or server 110 via a mobile application installed on mobile computing device 130.

In some embodiments, server 110 may be coupled to database 120. Database 120 may include waste management information 145. For example, device 105 may access waste management information 145 in database 120 over network 115 via server 110. Waste management information 145 may include information regarding an address of a premises, a level of service for a premises (e.g., basic service, enhanced service, concierge service, etc.), an identifier associated with a trash receptacle, account information, billing/payment information, route information, scheduling information, and the like. Database 120 may be internal or external to the server 110. In one example, device 105 may be coupled directly to database 120, database 120 being internal or external to device 105. Further details regarding the waste management module 140 are discussed below.

Figure 2:
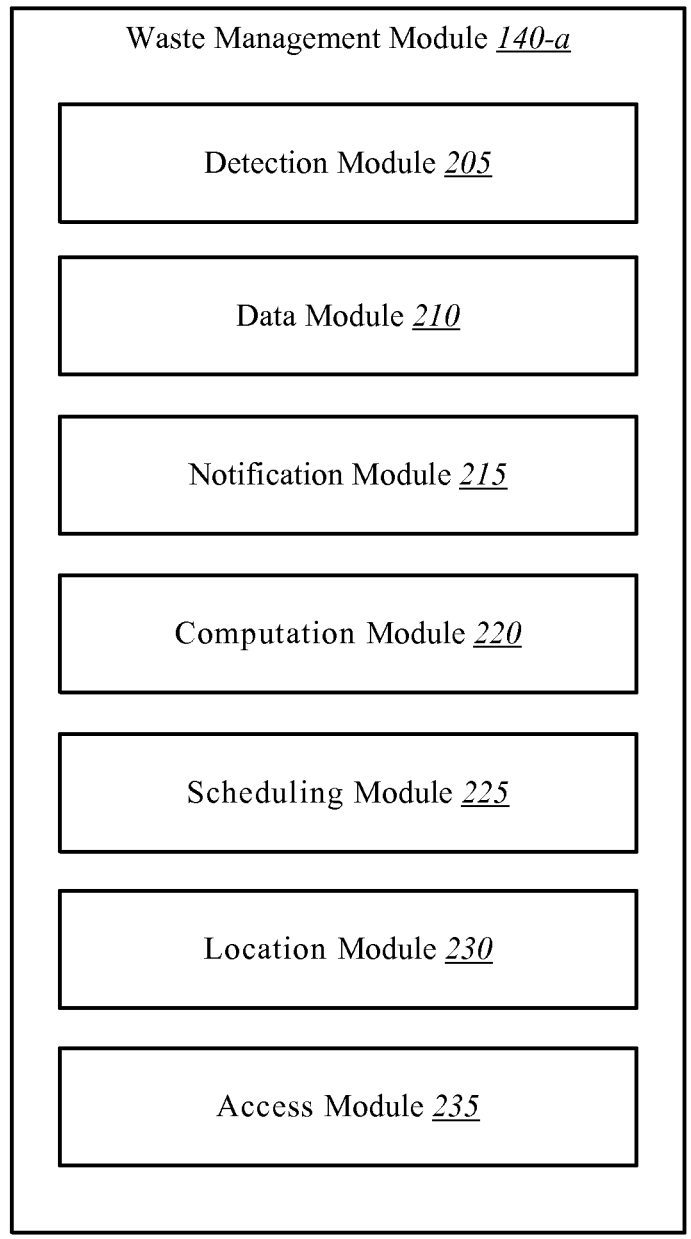
FIG. 2 is a block diagram illustrating one example of a waste management module.

FIG. 2 is a block diagram illustrating one example of a waste management module 140-*a*. Waste management module 140-*a* may be one example of waste management module 140 depicted in FIG. 1. As depicted, waste management module 140-*a* may include a detection module 205, data module 210, notification module 215, computation module 220, scheduling module 225, location module 230, and access module 235.

In one embodiment, detection module 205 may detect one or more events and/or conditions relative to a trash receptacle. Examples of trash receptacles include residential trash receptacles configured for road side collection by a waste collection vehicle (e.g., garbage cans, wheeled trash bins with hinged lids, etc.), commercial dumpsters, demolition dumpsters, roll-off dumpsters, and any other type of trash receptacle from which trash is collected by a waste management company. Thus, a waste collection vehicle may be configured to collect trash directly from the trash receptacle.

Waste collection vehicles may include residential waste collection vehicles, commercial waste collection vehicles, recycling collection vehicles, commercial waste collection vehicles for large commercial dumpsters (e.g., roll-off dumpsters used for construction and/or demolition sites), front-loading waste collection vehicle for picking up dumpsters (e.g., dumpsters at schools, restaurants, apartments, businesses, etc.), rear-loading waste collection vehicles, side-loading waste collection vehicles, pneumatic waste collection vehicles, and automated and/or semi-automated waste collection vehicles configured to collect trash from trash receptacles placed at or near the road side.

In some cases, detection module 205 may detect the one or more events and/or conditions in conjunction with sensor 125. Detection module 205 may detect a volume of trash within the trash receptacle, the weight of the trash within the trash receptacle, and/or an opening of a lid of the trash receptacle. Additionally, or alternatively, detection module 205 may detect the trash receptacle being picked up and emptied by the waste collection vehicle, determine that trash in the trash receptacle is within a predetermined range of a maximum capacity of the trash receptacle, and determine a location of the trash receptacle. In some cases, the volume of trash may be determined via a ranging sensor (e.g., acoustic ranging sensor, optical ranging sensor, etc.), the weight of the trash may be determined via a load sensor, and the opening of the lid may be detected via an accelerometer. In one example, the emptying of the trash receptacle may be detected via an accelerometer. In some cases, an accelerometer sensor may detect when the trash receptacle is being tipped over on its side. The detection of trash in the trash receptacle being within a predetermined range of a maximum capacity of the trash receptacle may be determined via a ranging sensor. The location of the trash receptacle may be determined via a location sensor (e.g., GPS, local positioning system (LPS), wireless location system, etc.).

In one embodiment, data module 210 may receive data related to an event and/or condition detected via a sensor coupled to the trash receptacle and process the data. Notification module 215 may generate a notification based on the processing of the data. Accordingly, notification module 215 may generate a notification based on certain movements of the trash receptacle detected by an accelerometer. In one embodiment, a notification may be generated indicating that the trash receptacle is tipped over. The notification may include an indication of how much trash was in the trash receptacle before it was tipped over. In one example, notification module 215 may generate a notification based on a determination of a volume of trash within the trash receptacle. In some cases, notification module 215 may generate a notification based on a determination of a weight of the trash within the trash receptacle. In one embodiment, computation module 220 may estimate a density of the trash within the trash receptacle. Computation module 220 may estimate the density of the trash within the trash receptacle by computing a ratio of the volume of the trash to the weight of the trash in the trash receptacle.

In some cases, the notification module 215 may generate a notification upon the detection module 205 determining that the available volume, expended volume, available load, expended load, and/or computed density satisfies a predetermined threshold. For example, whenever the available volume is 5% or less, notification module 215 may generate a notification indicating low availability in the trash receptacle. In another example, the waste management module 140-*a* may determine that a significant portion of the available volume of the trash receptacle is expended (e.g., a predetermined percentage of volume is expended), whereas the load of the trash in the trash receptacle is relatively low (e.g., the measured load is below a predetermined threshold). Accordingly, an owner of the trash receptacle may be notified of events and conditions regarding the trash receptacle being moved in a certain manner, conditions concerning volume and load of trash in the trash receptacle, and situations where the expended volume of trash is high and the load of the trash is low, indicating that the trash may be further compacted to make room for additional trash.

In some cases, notification module 215 may generate a notification upon the detection module 205 detecting the trash receptacle being picked up and emptied by the waste collection vehicle. In one example, notification module 215 may generate a notification upon the detection module 205 determining trash in the trash receptacle is within a predetermined range of a maximum capacity of the trash receptacle. For example, a ranging sensor may determine that the level of the trash in the trash receptacle is within 95% of the maximum capacity for trash in the trash receptacle. In one embodiment, scheduling module 225 may automatically schedule a pickup for the trash receptacle based on the determination that trash in the trash receptacle is within a predetermined range of a maximum capacity of the trash receptacle (e.g., a computing device automatically scheduling without human intervention). For example, upon detecting the trash is at or near capacity, or exceeding capacity, a device of FIG. 1 may communicate a request for a pickup to a waste management company. In some cases, the communicated request may only include a signal (e.g., a binary "1" for full and a binary "0" for not-full) from a sensor that detects an amount of trash in a trash receptacle. Additionally, or alternatively, a text-based message may be communicated to the waste management company. In some cases, the text-based message may indicate capacity, identification information (e.g., trash receptacle A is full, trash receptacle B is not full), address of the premises, etc.

Notification module 215 may generate a notification of the automatically scheduled pickup. In some cases, the notification module 215 may enable the occupant to confirm the scheduled pickup, cancel the scheduled pickup, request a different time/day for the scheduled pickup, etc. In some cases, location module 230 may determine a location of the trash receptacle (e.g., via GPS, LPS, wireless locating, etc.). In one example, notification module 215 may generate a notification regarding the location of the trash receptacle in relation to the scheduled pickup. For example, notification module 215 may generate a notification indicating that a pickup has been scheduled for the next day sometime between the hours of 8:00 A.M. and 9:00 A.M., that the current location of the trash receptacle is on the side of the house, and suggesting that the trash receptacle be taken to the road side before the scheduled pickup. In some cases, a waste management company may provide concierge service where an employee of the waste management company moves the trash receptacle to the road side for collection and returns the trash receptacle to its usual designated location at the premises. Thus, notification module 215 may notify the owner that the pickup is scheduled and that concierge service will handle the moving of the trash receptacle to the road side for trash collection. In some cases, the determined location of the trash receptacle may be used by the waste management company. For example, on the day of the scheduled pickup, the waste management company, in communication with waste management module 140-*a*, may determine that the trash receptacle of a house is still located at the side of the house instead of on the road side. Upon determining the trash receptacle is not at the road side for pickup, the waste management company may send a notification to waste management module 140-*a* in order to notify an occupant that the pickup is scheduled for that day and that the trash receptacle is not in the designated location for pickup. In some cases, upon arriving at the premises and finding that the trash receptacle is not at the designated location for pickup, an employee of the waste management company may move the trash receptacle into place for collection. The waste management company may charge an additional fee to the occupant for having to get out of the waste collection vehicle and move the trash receptacle to the road side.

In some embodiments, a waste management module associated with a neighboring premises may initiate a query for available trash receptacle volume within a predetermined geographic area. The premises may be within this predetermined geographic area. Accordingly, detection module 205 may determine whether a trash receptacle of the premises has capacity available for purchase by the neighboring premises. In response to a query by neighboring premises, detection module 205 may determine available volume in a trash receptacle of the premises. In one example, the premises may have a wheeled road-side residential trash receptacle with available capacity. In another example, the occupant of the premises may rent a roll-off dumpster for construction/demolition that is located at the premises. The roll-off dumpster may be configured to communicate with waste management module 140-*a*, making the volume in the roll-off dumpster available for purchase by a neighboring premises. In some cases, the waste management module 140-*a* may query the occupant of the premises to approve of the purchase before making the capacity available to a neighboring premises. The waste management module 140-*a* may provide a user interface enabling the occupant to approve the purchase. In some cases, the occupant may configure a policy to allow purchase of available capacity. In some cases, the policy may be stored in one or more devices of environment 100 (e.g., device 105, mobile computing device 130, automation controller 135, server 110, database 120, etc.). In one example, the occupant may configure a policy to allow purchases of available capacity based on the amount of available capacity (e.g., automatically approve purchase if capacity is below 50%, otherwise verify purchase with occupant, etc.), based on the day of the week, based on a calendar date (e.g., no purchases allowed during the week of Christmas, etc.), and the like.

In some embodiments, the trash receptacle of the premises may include a locking mechanism. In some cases, the locking mechanism may include a remote-actuated locking mechanism. Accordingly, access module 235 may generate a temporary access code and send the temporary access code to the neighboring premises, the temporary access code being associated with the remote-actuated locking mechanism on the trash receptacle. The neighbor may carry a device that communicates the temporary access code to the waste management module 140-a. In some cases, the temporary access code may be communicated via a short-range wireless technology (e.g., near-field communication (NFC), radio-frequency identification (RFID), BLUETOOTH® low power, and the like). Upon verifying the access code, access module 235 may send a command to unlock a lid of the trash receptacle via the remote-actuated locking mechanism. Thus, the neighboring premises may gain access to the trash receptacle temporarily via an access code generated and relayed by access module 235. The temporary access code may expire upon a predetermined time and/or upon granting access upon verifying the temporary access code. In some cases, the trash receptacle may be fitted and/or associated with an image sensor. In some cases, the image sensor may capture an image of a user at the trash receptacle, and the waste management module 140-a may grant access to the trash receptacle based on the computation module 220 performing a facial recognition algorithm in relation to the captured image and the computation module 220 recognizing the user as being an authorized user of the trash receptacle. Upon the detection module 205 detecting the lid of the trash receptacle in a closed position, access module 235 may automatically lock the lid via the remote-actuated locking mechanism. Subsequently, the neighboring premises may be charged according to the detected volume used and/or detected weight of the trash deposited by the neighbor in the trash receptacle of the premises.

Likewise, in some cases, the occupant of the premises and/or waste management module 140-a may initiate a query to purchase capacity from a neighboring trash receptacle. For example, detection module 205 may determine that the one or more trash receptacles associated with the premises have only a predetermined minimum amount of volume available. The neighboring trash receptacle may be a trash receptacle that does not belong to the occupant of the premises, but one that belongs to a neighboring premises within a predetermined vicinity of the premises, such as a neighboring home, school, restaurant, business, etc. Thus, upon receiving notification of available capacity, the occupant of the premises may carry trash to the neighboring trash receptacle, which in some cases may be accessed via a temporary access code, deposit his or her trash in the neighboring trash receptacle, and then be charged according to the determined volume used and/or weight of the trash deposited in the neighboring trash receptacle by the occupant.

Figure 3:
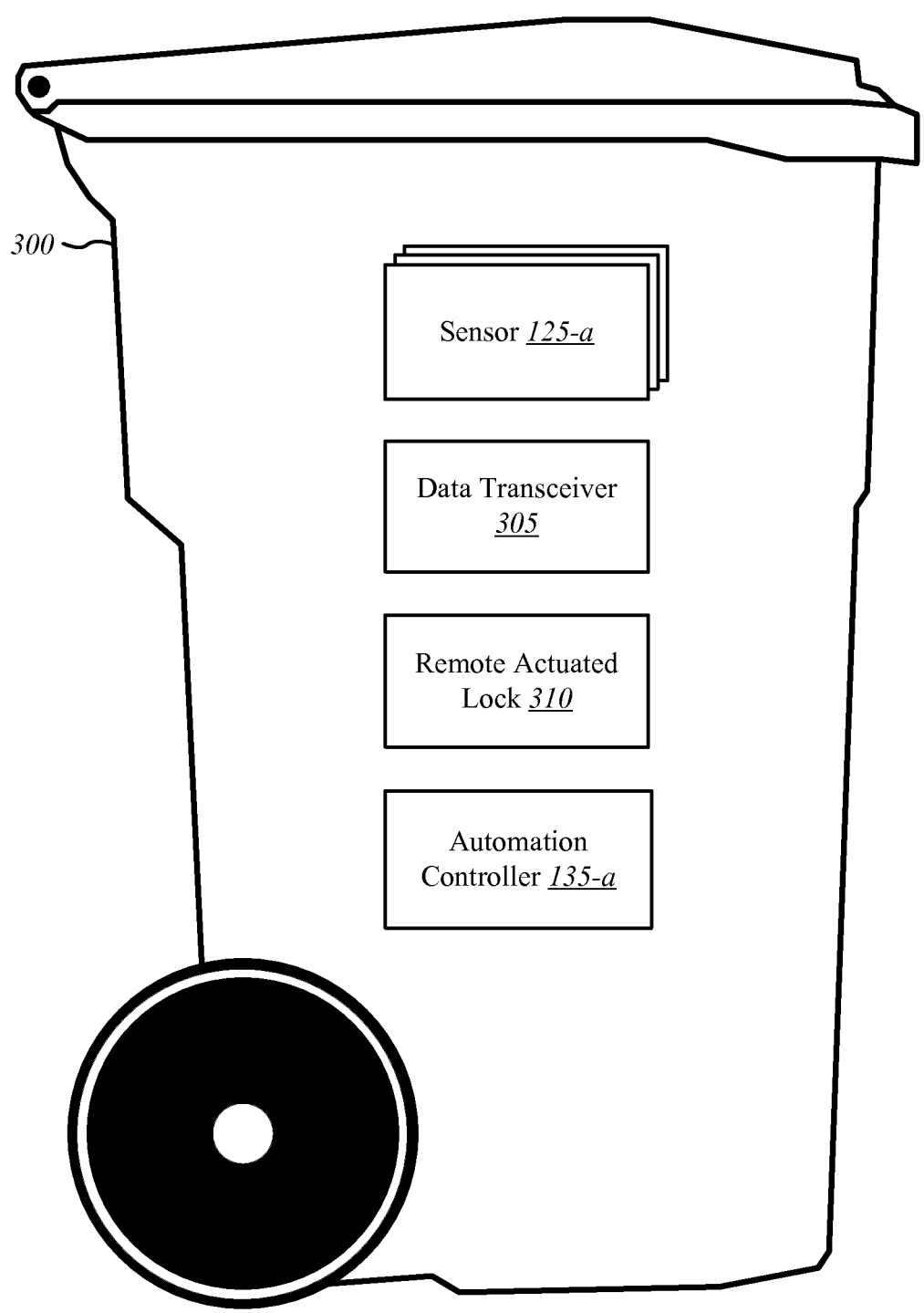
FIG. 3 is a block diagram illustrating one example of a trash receptacle for enabling the automated waste management to the premises.

FIG. 3 is a block diagram illustrating one example of a trash receptacle 300 for the automated waste management. Trash receptacle 300 may be associated with a premises (home, business, school, etc.). As depicted, the trash receptacle 300 may include at least one sensor 125-a and a data transceiver 305. In some cases, the trash receptacle 300 may include a remote actuated lock 310. In some embodiments, trash receptacle 300 may include automation controller 135-a. Automation controller 135-a may be one example of automation controller 135 of FIG. 1. In some cases, trash receptacle 300 may communicate with automation controller 135-a via data transceiver 305 in cases where automation controller 135-a is located external to trash receptacle 300.

As described above, trash receptacle 300 may include one or more sensors 125-a, including an accelerometer, a ranging sensor, a load sensor, a location sensor (GPS, LPS, etc.), an image sensor, access-code reader (e.g., NFC, RFID, BT low power, etc.), motion sensor, proximity sensor, and the like. Data transceiver 305 may communicate information regarding an event detected via sensor 125-a to automation controller 135-a. Automation controller 135-a may generate a notification based on the detected event and send the notification to a device used by an occupant of the premises (e.g., mobile computing device, desktop, television via a set top box, etc.). As stated above, automation controller 135-a may be located internal and/or external to trash receptacle 300. In some cases, a remote actuated lock 310 may keep the lid of the trash receptacle 300 locked at all times, except when a user provides a valid access code. In some cases, a user may store an access code on a device (e.g., smart phone, key fob, etc.). The access code may be wirelessly transmitted to the remote actuated lock 310, verified, and upon determining the access code is valid, remote actuated lock 310 may unlock the lid granting access to the trash receptacle.

Figure 4:
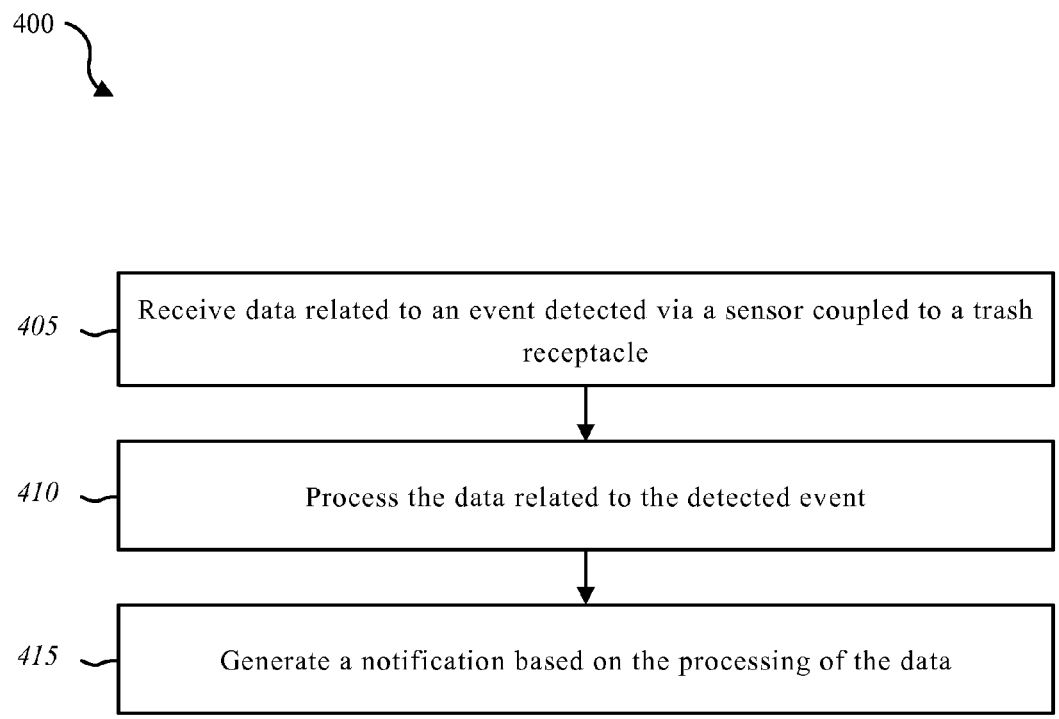
FIG. 4 is a flow diagram illustrating one embodiment of a method for automated waste management.

FIG. 4 a flow diagram illustrating one embodiment of a method 400 for automated waste management. In some configurations, the method 400 may be implemented by the waste management module 140 illustrated in FIG. 1 or 2. In some configurations, the method 400 may be implemented in conjunction with an application and/or a user interface associated with one or more devices depicted in FIGS. 1 and/or 3.

At block 405, data related to an event detected via a sensor coupled to a trash receptacle may be received. The trash receptacle may be of a type where its trash is collected directly by a waste collection vehicle (e.g., a dumpster, a residential trash bin that is collected when left at a road side, etc.). At block 410, the data related to the detected event may be processed. At block 415, a notification may be generated based on the processing of the data. Accordingly, one or more notifications may be generated based on varying detected statuses associated with the trash receptacle. For example, a notification may be generated upon determining a volume of trash within the trash receptacle, upon determining a weight of the trash within the trash receptacle, upon determining a density of the trash within the trash receptacle, upon detecting an opening of a lid of the trash receptacle, upon detecting the trash receptacle being picked up and emptied by waste collection vehicle, and the like.

Figure 5:
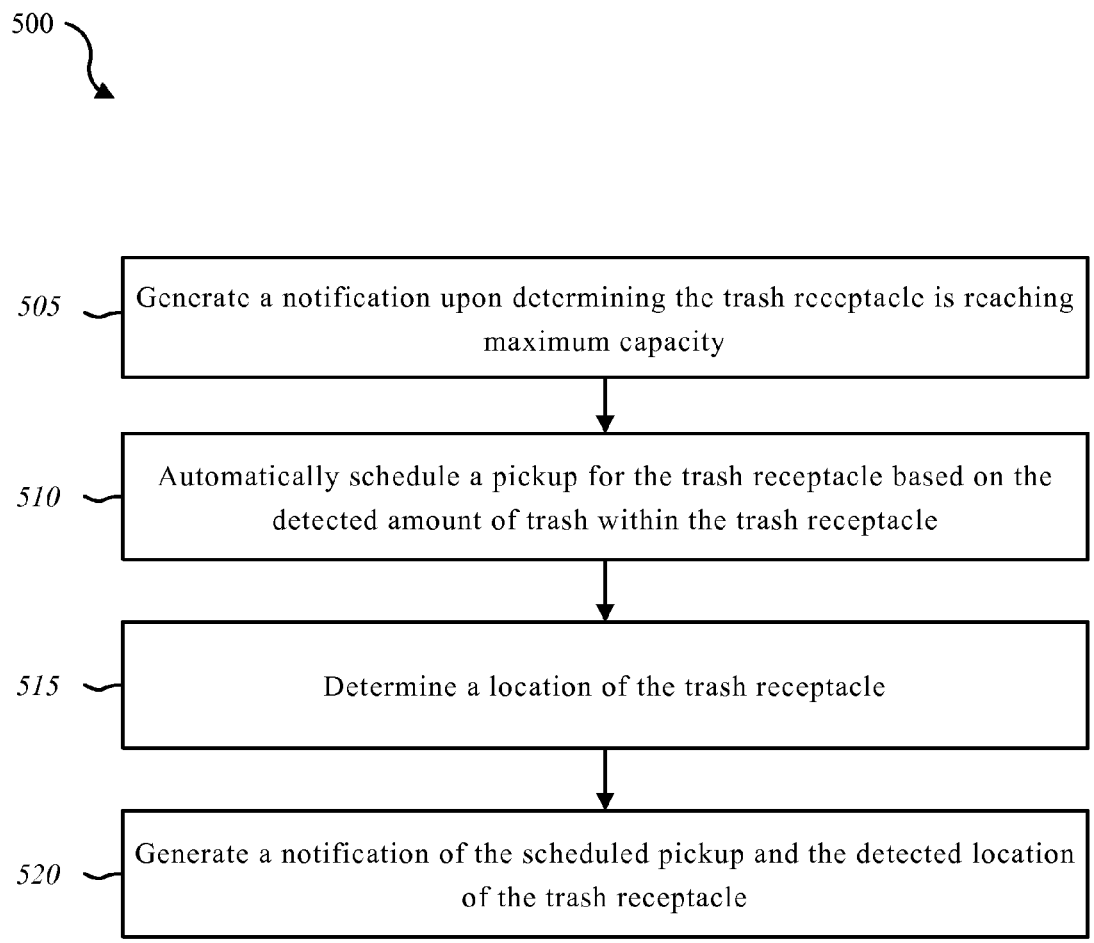
FIG. 5 is a flow diagram illustrating one embodiment of a method for automatically scheduling a pickup of a trash receptacle.

FIG. 5 is a flow diagram illustrating one embodiment of a method 500 for automatically scheduling a pickup of a trash receptacle. In some configurations, the method 500 may be implemented by the waste management module 140 illustrated in FIG. 1 or 2. In some configurations, the method 500 may be implemented in conjunction with an application and/or a user interface associated with one or more devices depicted in FIGS. 1 and/or 3.

At block 505, a notification may be generated upon determining trash in the trash receptacle is within a predetermined range of a maximum capacity of the trash receptacle. At block 510, a pickup for the trash receptacle may be automatically scheduled upon determining that trash in the trash receptacle is within the predetermined range of the maximum capacity of the trash receptacle. The waste management company may respond to the request with information regarding a scheduled pickup. The occupant may then be notified regarding the scheduled pickup. In some cases, the occupant may confirm the scheduled pickup, cancel the scheduled pickup, request a different time/day for the scheduled pickup, etc. At block 515, a location of the trash receptacle may be determined. In some cases the trash receptacle may include a location device (e.g., GPS, LPS, etc.). At block 520, may be generated a notification of the scheduled pickup and the detected location of the trash receptacle.

Figure 6:
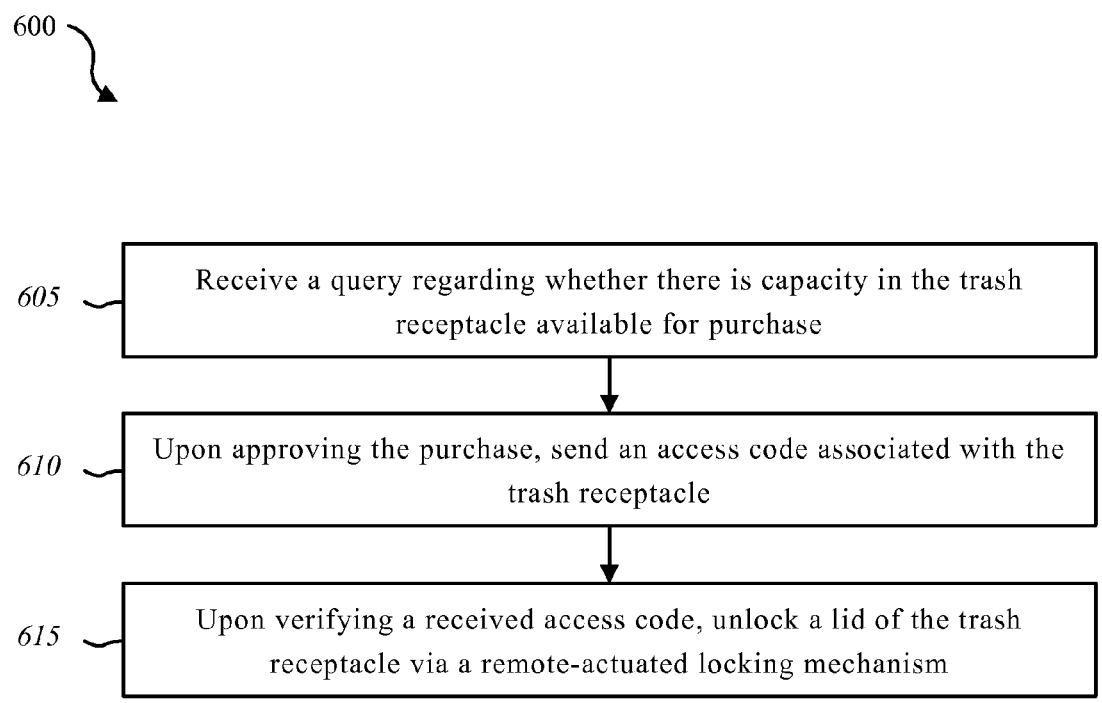
FIG. 6 is a flow diagram illustrating one embodiment of a method for making available capacity within a trash receptacle available for purchase.

FIG. 6 is a flow diagram illustrating one embodiment of a method 600 for making available capacity within a trash receptacle available for purchase. In some configurations, the method 600 may be implemented by the waste management module 140 illustrated in FIG. 1 or 2. In some configurations, the method 600 may be implemented in conjunction with an application and/or a user interface associated with one or more devices depicted in FIGS. 1 and/or 3.

Figure 7:
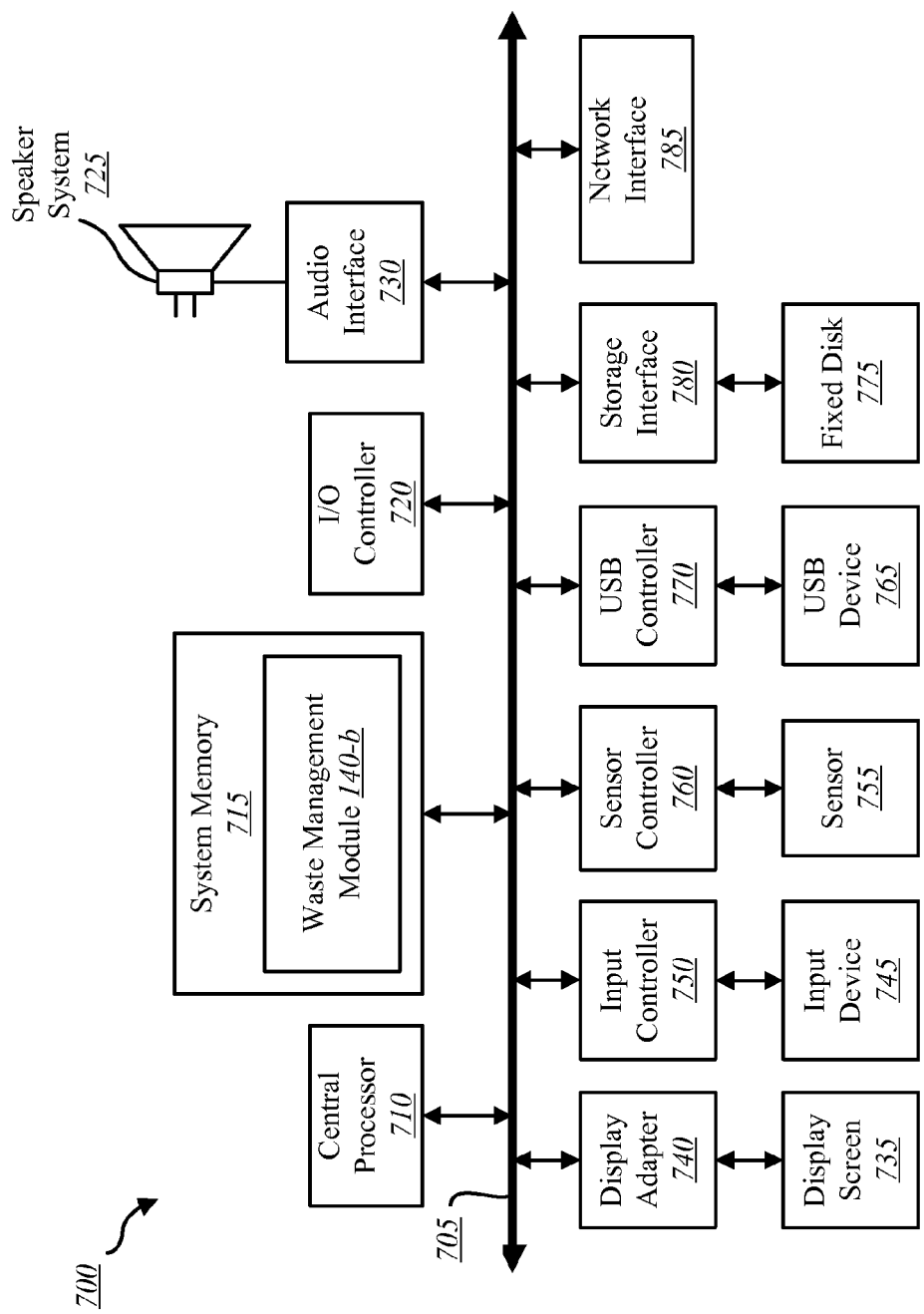
FIG. 7 depicts a block diagram of a computer system suitable for implementing the present systems and methods.

At block 605, a query may be received from a neighboring premises regarding whether there is capacity in the trash receptacle available for purchase. The system may notify an occupant of the premises regarding the query. The system may provide a user interface enabling the occupant to approve the purchase. At block 610, an access code associated with the trash receptacle may be generated and sent to the neighboring premises. An occupant of the neighboring premises may use the access code to access the trash receptacle. At block 615, upon verifying a received access code, a lid of the trash receptacle may be unlocked via a remote-actuated locking mechanism. In some embodiments, upon detecting the lid of the trash receptacle in a closed position (e.g., the neighboring occupant closes the lid after using the trash receptacle), the lid may be automatically locked via the remote-actuated locking mechanism FIG. 7 depicts a block diagram of a controller 700 suitable for implementing the present systems and methods. The controller 700 may be an example of the set top box device 105, mobile computing device 155, and/or automation controller 160 illustrated in FIG. 1. In one configuration, controller 700 includes a bus 705 which interconnects major subsystems of controller 700, such as a central processor 710, a system memory 715 (typically RAM, but which may also include ROM, flash RAM, or the like), an input/output controller 720, an external audio device, such as a speaker system 725 via an audio output interface 730, an external device, such as a display screen 735 via display adapter 740, an input device 745 (e.g., remote control device interfaced with an input controller 750), multiple USB devices 765 (interfaced with a USB controller 770), and a storage interface 780. Also included are at least one sensor 755 connected to bus 705 through a sensor controller 760 and a network interface 785 (coupled directly to bus 705).

Bus 705 allows data communication between central processor 710 and system memory 715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the waste management module 140-*b* to implement the present systems and methods may be stored within the system memory 715. Applications resident with controller 700 are generally stored on and accessed via a non-transitory computer readable medium, such as a hard disk drive (e.g., fixed disk 775) or other storage medium. Additionally, applications can be in the form of electronic signals modulated in accordance with the application and data communication technology when accessed via interface 785.

Storage interface 780, as with the other storage interfaces of controller 700, can connect to a standard computer readable medium for storage and/or retrieval of information, such as a fixed disk drive 775. Fixed disk drive 775 may be a part of controller 700 or may be separate and accessed through other interface systems. Network interface 785 may provide a direct connection to a remote server via a direct network link to the Internet via a POP (point of presence). Network interface 785 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 700 wirelessly via network interface 785.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 7 need not be present to practice the present systems and methods. The devices and subsystems can be interconnected in different ways from that shown in FIG. 7. The aspect of some operations of a system such as that shown in FIG. 7 are readily known in the art and are not discussed in detail in this application. Code to implement the present disclosure can be stored in a non-transitory computer-readable medium such as one or more of system memory 715 or fixed disk 775. The operating system provided on controller 700 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for automated waste management, comprising:
   receiving data related to an event detected via a sensor coupled to a trash receptacle;
   processing the data related to the detected event;
   determining a pattern relative to an operation of the trash receptacle based at least in part on the data related to the detected event;
   receiving a query from a neighboring premises regarding whether there is capacity in the trash receptacle available for purchase;
   predicting a future activity associated with the trash receptacle based at least in part on the determined pattern;
   automatically approving purchase of available capacity in the trash receptacle based at least in part on the predicted future activity and the processing of the data; and
   unlocking a lid of the trash receptacle via a remote-actuated locking mechanism and generating a notification based at least in part on automatically approving the purchase of available capacity in the trash receptacle.

2. The method of claim 1, further comprising:
   generating a notification based on a determination of a volume of trash within the trash receptacle, the volume being determined via a ranging sensor.

3. The method of claim 2, further comprising:
   generating a notification based on a determination of a weight of the trash within the trash receptacle, the weight being determined via a load sensor.

4. The method of claim 3, further comprising:
   determining a density of the trash within the trash receptacle, the density being determined by computing a ratio of the volume of the trash to the weight of the trash in the trash receptacle.

5. The method of claim 1, further comprising:
   generating a notification upon detecting an opening of the lid of the trash receptacle, the opening of the lid being detected via an accelerometer.

6. The method of claim 5, wherein a waste collection vehicle is configured to collect trash directly from the trash receptacle, the method further comprising:
   generating a notification upon detecting the trash receptacle being picked up and emptied by the waste collection vehicle, the emptying of the trash receptacle being detected via the accelerometer.

7. The method of claim 1, further comprising:
   generating a notification upon determining trash in the trash receptacle is within a predetermined range of a maximum capacity of the trash receptacle.

8. The method of claim 7, further comprising:
   automatically scheduling a pickup for the trash receptacle upon determining that trash in the trash receptacle is within the predetermined range of the maximum capacity of the trash receptacle.

9. The method of claim 8, further comprising:
   determining a location of the trash receptacle; and
   generating a notification of the scheduled pickup and the detected location of the trash receptacle.

10. The method of claim 1, further comprising:
    generating a notification upon receiving the query from a neighboring premises regarding whether there is capacity in the trash receptacle available for purchase.

11. The method of claim 10, further comprising:
    upon approving the purchase, sending an access code associated with the trash receptacle; and
    upon verifying a received access code, unlocking the lid of the trash receptacle via the remote-actuated locking mechanism.

12. The method of claim 11, further comprising:
    upon detecting the lid of the trash receptacle in a closed position, automatically locking the lid via the remote-actuated locking mechanism.

13. A computing device configured for automated waste management, comprising:
    a processor;
    memory in electronic communication with the processor;
    instructions stored in the memory, the instructions being executable by the processor to:
       receive data related to an event detected via a sensor coupled to a trash receptacle;
       process the data related to the detected event;

determine a pattern relative to an operation of the trash receptacle based at least in part on the data related to the detected event;

receive a query from a neighboring premises regarding whether there is capacity in the trash receptacle available for purchase;

predict a future activity associated with the trash receptacle based at least in part on the determined pattern;

automatically approve purchase of available capacity in the trash receptacle based at least in part on the predicted future activity and the processing of the data; and unlock a lid of the trash receptacle via a remote-actuated locking mechanism and generate a notification based at least in part on automatically approving the purchase of available capacity in the trash receptacle.

14. The computing device of claim 13, wherein the instructions are executable by the processor to:

generate a notification based on a determination of a volume of trash within the trash receptacle, the volume being determined via a ranging sensor.

15. The computing device of claim 14, wherein the instructions are executable by the processor to:

generate a notification based on a determination of a weight of the trash within the trash receptacle, the weight being determined via a load sensor; and determine a density of the trash within the trash receptacle, the density being determined by computing a ratio of the volume of the trash to the weight of the trash in the trash receptacle.

16. The computing device of claim 13, wherein the instructions are executable by the processor to:

generate a notification upon detecting an opening of the lid of the trash receptacle, the opening of the lid being detected via an accelerometer; and generate a notification upon detecting the trash receptacle being picked up and emptied by a waste collection vehicle, the emptying of the trash receptacle being detected via the accelerometer.

17. The computing device of claim 13, wherein the instructions are executable by the processor to:

generate a notification upon determining trash in the trash receptacle is within a predetermined range of a maximum capacity of the trash receptacle; and automatically schedule a pickup for the trash receptacle upon determining that trash in the trash receptacle is within the predetermined range of the maximum capacity of the trash receptacle.

18. The computing device of claim 13, wherein the instructions are executable by the processor to:

generating a notification upon receiving the query from a neighboring premises regarding whether there is capacity in the trash receptacle available for purchase.

19. A computer-program product for automating, by a processor, waste management, the computer-program product comprising a non-transitory computer-readable medium storing instructions thereon, the instructions being executable by the processor to:

receive data related to an event detected via a sensor coupled to a trash receptacle;

process the data related to the detected event;

determine a pattern relative to an operation of the trash receptacle based at least in part on the data related to the detected event;

receive a query from a neighboring premises regarding whether there is capacity in the trash receptacle available for purchase;

predict a future activity associated with the trash receptacle based at least in part on the determined pattern;

automatically approve purchase of available capacity in the trash receptacle based at least in part on the predicted future activity and the processing of the data; and unlock a lid of the trash receptacle via a remote-actuated locking mechanism and generate a notification based at least in part on automatically approving the purchase of available capacity in the trash receptacle.

20. The computer-program product of claim 19, wherein the instructions are executable by the processor to:

generate a notification based on a determination of a volume of trash within the trash receptacle, the volume being determined via a ranging sensor; and generate a notification based on a determination of a weight of the trash within the trash receptacle, the weight being determined via a load sensor.

* * * * *